United States Patent [19]
Dennis

[11] Patent Number: 5,782,101
[45] Date of Patent: Jul. 21, 1998

[54] HEAT PUMP OPERATING IN THE HEATING MODE REFRIGERANT PRESSURE CONTROL

[75] Inventor: Richard Dale Dennis, Bridgeport, N.Y.

[73] Assignee: Carrier Corporation, Syracuse, N.Y.

[21] Appl. No.: 807,618

[22] Filed: Feb. 27, 1997

[51] Int. Cl.⁶ .................................................. F25D 17/04
[52] U.S. Cl. .......................... 62/186; 62/160; 62/DIG. 17
[58] Field of Search ............................. 62/186, 160, 180, 62/179, DIG. 17, 183, 184

[56] References Cited

U.S. PATENT DOCUMENTS

| | | |
|---|---|---|
| 2,943,457 | 7/1960 | Wile et al. . |
| 3,059,448 | 10/1962 | McGrath . |
| 3,354,665 | 11/1967 | Lewis . |
| 4,104,890 | 8/1978 | Iwasaki . |
| 4,326,387 | 4/1982 | Friedman . |
| 4,507,933 | 4/1985 | Chapa et al. . |
| 4,643,002 | 2/1987 | Dennis et al. . |
| 5,009,078 | 4/1991 | Ohkoshi et al. ........................ 62/160 |
| 5,036,676 | 8/1991 | Dudley ................................. 62/186 X |
| 5,247,805 | 9/1993 | Dennis . |
| 5,385,030 | 1/1995 | Kitagawa et al. ................... 62/186 X |
| 5,531,076 | 7/1996 | Pellenz et al. . |

*Primary Examiner*—Harry B. Tanner

[57] ABSTRACT

In a heat pump system operating in the heat cycle mode, a sensor is provided for sensing either the pressure or temperature of a refrigerant. A speed controller receives an output of the sensor so that the speed (including cycle rate) of an evaporator fan is controlled, resulting in control of the pressure or temperature of the refrigerant. The temperature or pressure of the refrigerant is controlled for a heat pump system comprising one refrigeration circuit and more than one refrigeration circuit. A separate speed control is provided for a fixed speed motor, a sleeve bearing fan motor, and a variable speed ball bearing fan motor.

17 Claims, 3 Drawing Sheets

HEAT PUMP OPERATING IN THE HEATING MODE REFRIGERANT PRESSURE CONTROL

BACKGROUND OF THE INVENTION

1. Field of the Invention

This invention relates generally to heat pump systems and more particularly to an apparatus for controlling the pressure of a refrigerant in a heat pump system operating in the heating mode.

2. Description of the Prior Art

Throughout this patent, the terms "evaporator" and "condenser" are used. They are each heat exchangers. In a heat pump, an evaporator absorbs heat, and a condenser rejects heat. A heat exchanger that is the evaporator in the heat pump heating cycle mode is the condenser in the heat pump cooling cycle mode, and a heat exchanger that is the condenser in the heat pump heating cycle mode is the evaporator in the heat pump cooling cycle mode. In a small residential heat pump with a commonly located outside heat exchanger, that outside heat exchanger is the evaporator in the heating cycle mode.

A heat pump operating in its heating cycle mode can build up excessive discharge pressure. Most likely, this excess pressure is caused by an imbalance between the comparatively greater amount of heat absorbed by its evaporator over the heat dissipated by its condenser.

A multi-split system is a heat pump that has more than one condenser coil. In a multi-split system, the condenser coils are generally not collocated. In a multi-split system, if the refrigerant flow is closed to at least one condenser coil, or at least one condenser coil fan is not engaged, an imbalance may be created between the heat absorbed by the evaporator and the lesser heat dissipated by the condenser. Furthermore, if the evaporator ambient temperature (ambient temperature) is warm or hot, there also may be an imbalance created between the greater heat absorbed by the evaporator over the heat dissipated by the condenser.

In a heat pump operating in its heating cycle mode, the higher the ambient temperature, or the greater the relative evaporator capacity as contrasted with the condenser capacity, the greater the possibility that the refrigerant pressure and temperature will be undesirably high. This condition is referred to as an evaporator-condenser imbalance.

An approach to lower the refrigerant pressure and temperature caused by an evaporator-condenser imbalance is to use the system pressure cut off switch to close down a heat pump. The system pressure cut-off switch however takes an entire heat pump off-line. The system pressure cut-off switch also closes at an emergency pressure which is unnecessarily higher than the desired pressure for release of an evaporator-condenser imbalance. A lowering of the pressure at which the system pressure cut off switch closes, to conform to the requirement of an evaporator-condenser imbalance, results in emergency switch closure at an unnecessarily low pressure.

Another approach to lower the refrigerant pressure and temperature caused by an evaporator-condenser imbalance is to use a hot-gas by-pass valve in the refrigerant line between the discharge side and the suction side of a compressor. Refrigerant pressure is sensed by a transducer, and if the pressure at the discharge side of a compressor is too high, the hot-gas by-pass valve is electrically actuated to at least partially bypass the compressor, and thus lower the refrigerant pressure. This approach adds complexity to a heat pump, including the bypass valve and piping. This approach also adds design and manufacturing cost to a heat pump, and is subject to noise and mechanical failure.

Yet another approach to lower the refrigerant pressure and temperature caused by an evaporator-condenser imbalance is to use a mechanically actuated hot-gas by-pass valve set to open at a preset discharge pressure. This approach adds the complexity, cost, noise, and susceptibility to failure of the electrically actuated hot-gas by-pass valve described above to a heat pump.

SUMMARY OF THE INVENTION

An object of this invention is to relieve excessive refrigerant heat and pressure indicative of an evaporator-condenser imbalance from a heat pump operating in its heating mode.

Another object of this invention is to relieve excessive refrigerant heat and pressure indicative of an evaporator-condenser imbalance specifically in a multi-split heat pump operating in its heating mode.

A further object of this invention is to relieve excessive refrigerant heat and pressure indicative of an evaporator-condenser imbalance from a heat pump operating in its heating mode before the refrigerant pressure reaches a level at which the system pressure cut off switch takes the heat pump off-line.

A still further object of this invention is to relieve excessive refrigerant heat and pressure indicative of an evaporator-condenser imbalance in a heat pump operating in its heating mode without employing a hot-gas by-pass valve, and without the cost, complexity, noise, and unreliability of a hot-gas by-pass valve.

These and other objects of the present invention are attained by a heat pump operating in the heating mode having a refrigerant pressure sensor and a speed controllable evaporator fan, wherein the speed of the evaporator fan is controlled so as to control the quantity of heat absorbed by the refrigerant, consequently controlling the refrigerant pressure and temperature.

Additionally, this invention includes controlling the speed of a fixed speed heating mode evaporator fan motor whose shaft is supported by sleeve bearings so as to control the refrigerant pressure and temperature and still provide lubrication of the sleeve bearings. The speed is controlled by cycling power to the motor.

Additionally, this invention includes controlling the speed of a variable speed heating mode evaporator fan motor whose shaft is supported by ball bearings at a targeted speed so as to control the refrigerant pressure and temperature at an optimal mix of dissipated heat and electrical efficiency.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION

This invention entails a novel way to lower the refrigerant pressure and temperature of a heat pump operating in its heating cycle mode with a motorized evaporator fan. As described hereinbefore, an evaporator-condenser imbalance is a cause of excessive refrigerant pressure and temperature. This excessive pressure and temperature can increase until it is so high that the heat pump system pressure cut off switch will open to release the pressure. This invention provides a heat pump operating in its heating cycle mode that can lower the absorption of heat by its, and thus rectify an evaporator-condenser imbalance, particularly in a multi-split system, without unnecessary valves, piping, pressure buildup, or without taking the heat pump off line.

Figure 1:
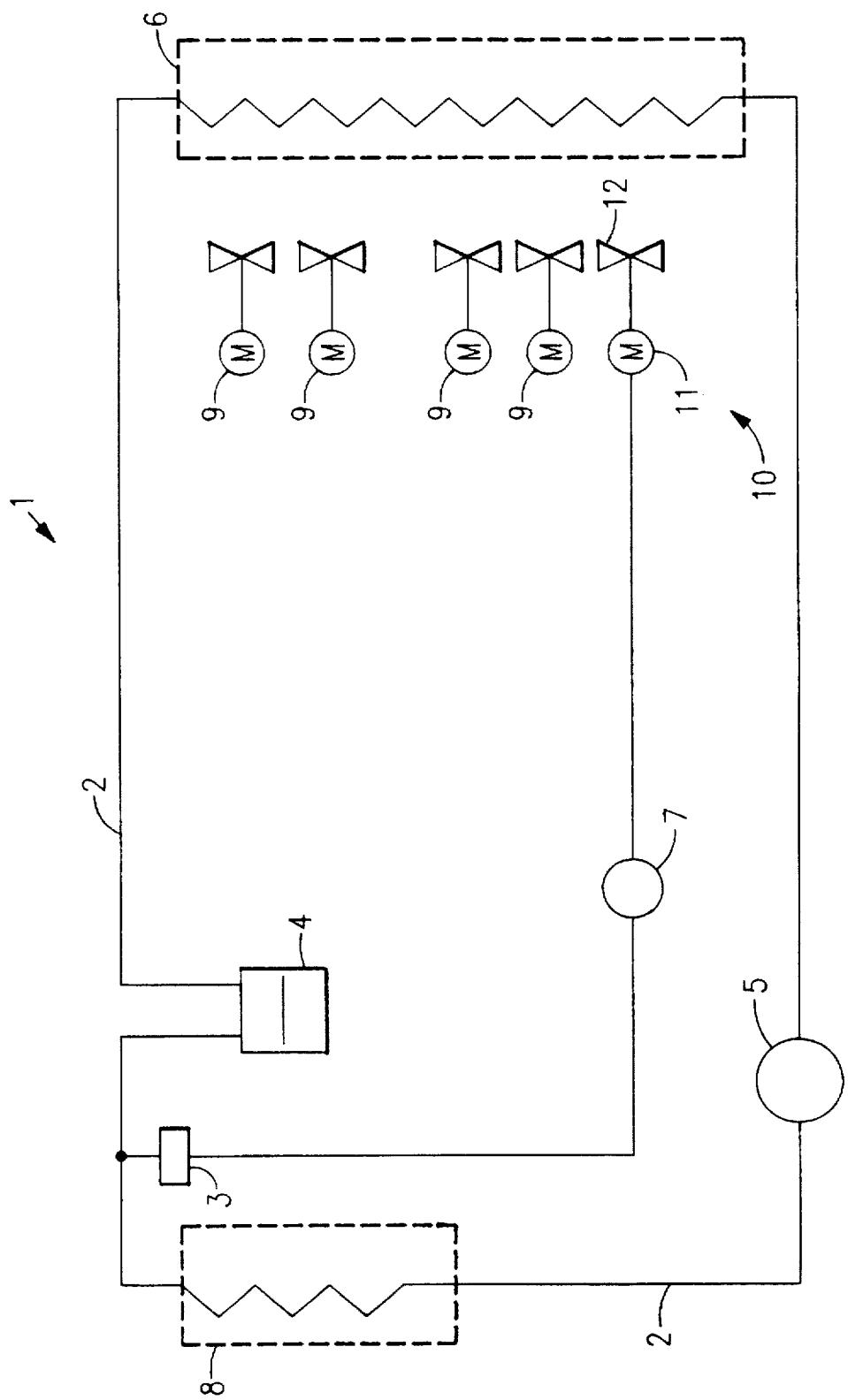
FIG. 1 is a simplified schematic diagram of a heat pump operating in its heating cycle mode.

Referring to FIG. 1, there is shown a simplified schematic diagram of a heat pump. FIG. 1 portrays this invention in its broadest terms. There is provided a heat pump 1 operating in its heating cycle mode, with a refrigerant line 2, a refrigerant pressure sensor 3, a compressor 4, an expansion device 5 (to create a pressure drop to change the refrigerant from a liquid state to a two-phase state), an evaporator 6, an evaporator fan speed controller 7, a condenser 8, at least one evaporator motorized fan 9, and at least one evaporator speed controlled motorized fan 10, comprising an evaporator fan motor 11 and an evaporator fan 12. The evaporator fan speed controller 7 receives inputs from the refrigerant pressure sensor 3 and controls the at least one motorized fan 9 speed. The evaporator fan speed controller 7 directs a reduced motorized fan speed so as to reduce evaporator heat absorption and consequently refrigerant pressure and temperature, when the refrigerant pressure becomes too great in any refrigerant circuit, and directs an increased motorized fan speed so as to increase evaporator heat absorption, and consequently refrigerant pressure and temperature, when the refrigerant pressure becomes too small in any refrigerant circuit. By controlling the motorized fan speed, the air quantity passing over the evaporator coil is controlled, and consequently the heat absorbed by the refrigerant is controlled. By another aspect of this invention, the refrigerant temperature, rather than the refrigerant pressure, is sensed and the predetermined thresholds are set in terms of temperature. There is a known relationship between refrigerant pressure and refrigerant temperature.

Referring again to FIG. 1, in accordance with one aspect of this invention, the refrigerant pressure is sensed to determine when it drops below a predetermined level and when it rises above a predetermined level. The evaporator fan speed controller 7 includes a solid state switching means that is caused to operate in response thereto, such that when the pressure rises above the predetermined level, the switching means turns power off to the at least one evaporator fan motor 11 and the fan 12 spins down, and when it subsequently drops below the predetermined level, the switching means turns power on to the evaporator fan motor 11, and the fan 12 spins up. When power is turned off to a motor, that motor is in the off power state. When power is turned on to a motor, that motor is in the on power state. This invention could be implemented by standard control circuitry comprising well known comparator/reference voltage/voltage divider circuitry. In accordance with another aspect of this invention, the evaporator fan speed controller 7 includes, rather than said solid state switching means, a computer with an associated stored program that is caused to operate in response thereto, such that when the pressure rises above the predetermined level, the evaporator fan speed controller 7 turns off power to the evaporator motorized fan and the fan spins down, and when the pressure subsequently drops below the predetermined level, the switching means turns power on to the evaporator fan motor, and the fan spins up. By another aspect of this invention, the refrigerant temperature, rather than the refrigerant pressure, is sensed and the predetermined thresholds are set in terms of temperature. There is a known relationship between refrigerant pressure and refrigerant temperature.

In accordance with yet another aspect of this invention, the evaporator contains a fan motor 10 that is variable speed and whose shaft is supported by at least one ball bearing. The fan motor 11 speed is controlled by the said computer with an associated stored program that outputs a cycle rate signal to the evaporator fan speed controller 7 for a computer targeted motor speed. The refrigerant pressure is sensed and the motor speed is controlled so that the refrigerant pressure and temperature are controlled at any pressure between that resulting from full motor speed to that resulting from no motor speed, such as a motor speed that gives the combination of adequate heat dissipation and best electrical efficiency at a given ambient temperature.

Figure 2:
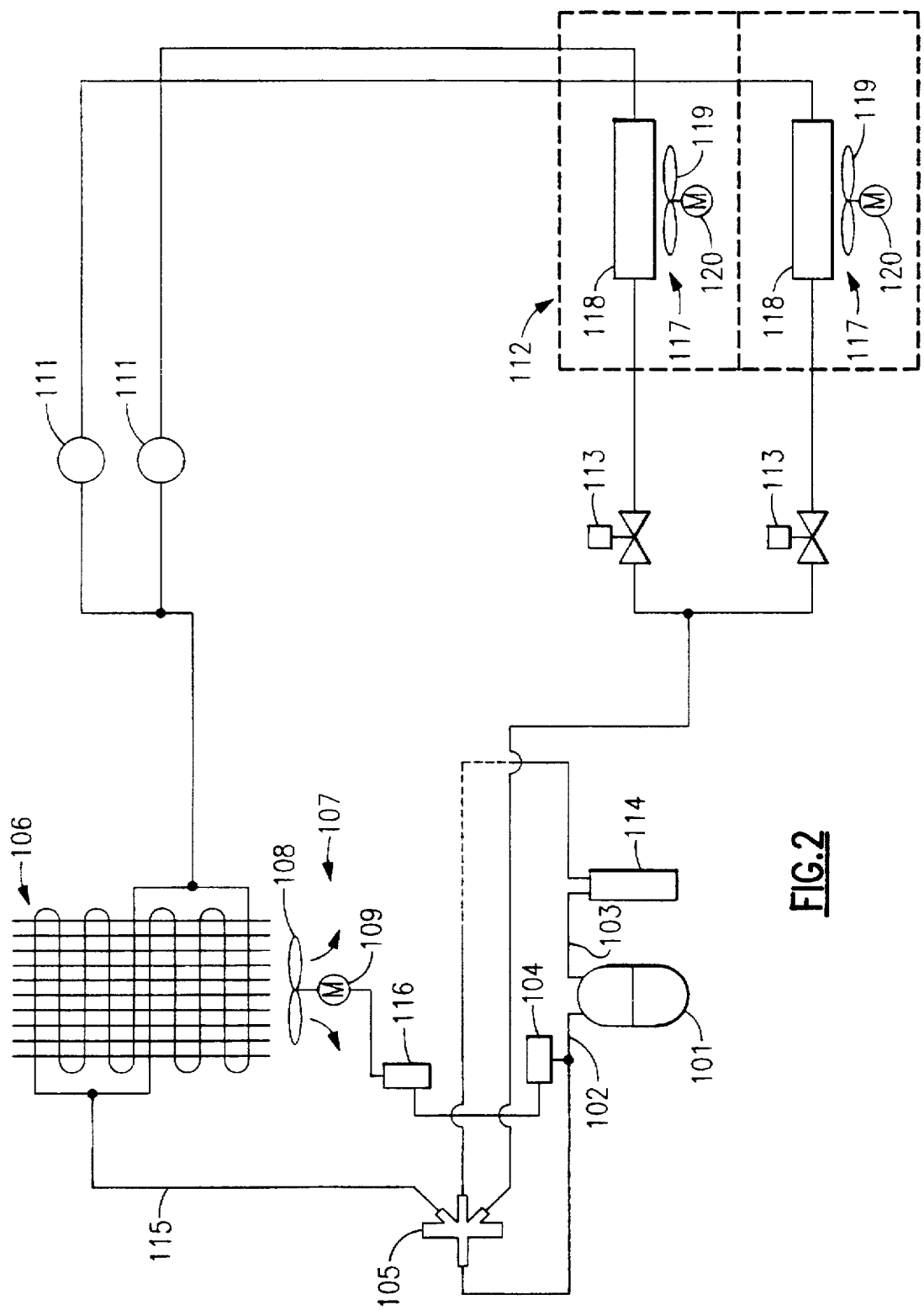
FIG. 2 is a simplified schematic diagram of the preferred embodiment of a single refrigerant circuit heat pump system with multiple condenser units operating in its heating cycle mode.

Referring now to FIG. 2, there is shown a simplified schematic diagram of the preferred embodiment of a heat pump system operating in its heating cycle mode. The heat pump is shown to include a compressor 101, a discharge side 102, an intake side 103, a sensor consisting of a pressure transducer 104, a reversing valve 105, an evaporator 106, a motor driven evaporator fan 107, comprising an evaporator fan 108 and an evaporator fan motor 109, expansion devices 111 (to create a pressure drop to change the refrigerant from a liquid state to a two-phase state), a condenser 112, gas solenoid valves 113 (to close refrigerant flow), an accumulator 114, a refrigerant line 115, and a fan control computer 116. The condenser 112 is multi-split, and each condenser unit 117 comprises a heat exchanger 118, a condenser fan 119, and a condenser fan motor 120. Each condenser unit is not collocated, and not in the same room.

The preferred embodiment of this invention utilizes a microcomputer to control a fixed speed evaporator motor supported by sleeve bearings. A microcomputer program is easier to alter than comparator/reference voltage/voltage divider circuitry, and state of the art heat pumps already contain a control and monitoring microcomputer which may be adapted for this invention. A fixed speed evaporator fan motor whose shaft is supported by at least one sleeve bearing is chosen because it is the most prevalent form of heat pump evaporator fan motor, and presents the special lubrication needs of a motor whose shaft is supported by at least one sleeve bearing. A single evaporator fan motor is presented because that is the most prevalent form of heating mode evaporator fan. Furthermore, a multi-split system is shown because a multi-split system, wherein some condenser coils do not dissipate heat, presents the most demonstrable need for this invention.

In accordance with an aspect of this invention, and as implemented in the preferred embodiment of this invention, the evaporator contains a motorized fan whose shaft is specifically supported by at least one sleeve bearing, and the control system is caused to function in such a manner as to ensure that each sleeve bearing is adequately lubricated. In a sleeve bearing motor, it is important that each sleeve bearing be lubricated when the motor is spinning so as to retard bearing wear. When a sleeve bearing supported motor comes to a complete stop, its lubricating oil drains from each bearing and each bearing will be unlubricated during the next start up. Thus, in this aspect of this invention, the refrigerant pressure thresholds are selected, for an ambient temperature, so that the duration of off-time (or the period between the off power state and the next on power state) is limited such that the fan motor never comes to a complete stop and the lubricating oil does not have sufficient time to drain from the bearings before the next on cycle commences. Thus, the refrigerant pressure is lowered and the sleeve bearings maintain their lubrication.

The preferred embodiment is a modified Carrier 38QRS024 heat pump. The Carrier 38QRS024 has a single refrigeration circuit with 2 ton capacity, where 1 ton equals 12,000 BTU. The Carrier 38QRS024 has a 20 amp. hermetic compressor, a single heating mode evaporator fan with an 18" diameter, 3 blades, and 27 degree pitch per blade, wherein the fan is driven by a ⅛ HP fixed speed 850 rpm sleeve bearing supported motor. The heating mode evaporator has a surface area of 6.1 square feet, and contains 34.9 inches of copper tubing and two rows of 15 aluminum fin per inch. The heating mode condenser comprises 2 separate units, with each unit designed to be placed in a separate room. Each condenser unit has a heat exchanger surface area of 2.3 square feet, and contains 27.2 inches of copper tubing and 1 row of 15 aluminum fins per inch. Each condenser unit is blown by a ⅟₃₀ HP motorized blower fan having 2 axially aligned 4 inch diameter, 18 inch long blower cylinders containing 34 tangentially mounted blades. The refrigerant is R22.

The preferred embodiment has a pressure transducer placed so that it measures refrigerant pressure at the discharge side of the compressor. This pressure is also referred to as head pressure. The transducer may be of various types; however, one that has been found satisfactory is a 5 VDC high and low pressure transducer 8 PSIA-420 PSIG which is commercially available from Texas Instruments, Inc. Alternatively, a thermistor could have been operatively connected to the refrigerant line to measure refrigerant temperature for those aspects of the invention that sense temperature rather than pressure.

The microcomputer is a 4 bit microcontroller having 992 4 bit RAM words, 16K 10 bit ROM words, and 58 I/O ports. It is already a component of the Carrier 38QRS024. It has been programmed to execute the state control logic shown in TABLE 1, and to be explained hereinafter. TABLE 1 is a state table of the preferred embodiment of a single refrigerant circuit heat pump system operating in its heating cycle mode showing the command logic for evaporator fan operation for various combinations of compressor discharge pressures.

TABLE 1

SINGLE REFRIGERATION CIRCUIT AND SINGLE OUTDOOR FAN HEAT PUMP STATE TABLE

| DISCHARGE PRESSURE OUTDOOR | FAN CONTROL |
|---|---|
| >315 psi | turn off |
| <315 psi, >285 psi | no action |
| <285 psi | turn on |

The refrigerant pressure is sensed by pressure transducer 104. Pressure transducer 104 is operatively connected at the discharge side 102 of compressor 101, which is expected to be the highest pressure in the refrigerant line. Pressure transducer 104 outputs an electrical signal to the fan control computer 116 that varies in accordance with, and are representative of, the compressor discharge pressure.

Fan control computer 116 executes a stored program that comprises the state control logic shown in TABLE 1. The fan control computer reads the refrigerant pressure as the pressure transducer electrical output, and compares the pressure to two predetermined levels: 285 PSI and 315 PSI.

These two predetermined levels were derived experimentally to obtain a mix of adequate refrigerant pressure control for a range of ambient temperatures, and a good balance of heat dissipation and electrical efficiency. In a balanced system (a system not in evaporator-condenser imbalance), the compressor discharge pressure approximates 300 PSI at relatively warm ambient temperatures. If only one condenser unit is operating, and if the evaporator fan motor is not provided with electrical power at a compressor discharge pressure greater than 315 PSI, the fan motor still maintains lubrication on its sleeve bearings when the compressor discharge pressure has decreased to 285 PSI. The 315 PSI and 285 PSI thresholds maintain a stable refrigerant pressure at ambient temperatures as high as 70 degrees Fahrenheit, closely approximate a condition in which lubricant is maintained on the sleeve bearings, and give a good condition of heating capability and electrical efficiency.

Referring to TABLE 1, when the compressor discharge pressure exceeds the 315 PSI predetermined level, the executing computer determines that the refrigerant is above the higher predetermined level, and if the discharge pressure is below the 285 PSI predetermined level, the executing computer determines that the refrigerant is below the lower predetermined level. If the compressor discharge pressure is greater than 315 PSI, the computer outputs a signal to turn the power off to the fan motor. The power to the fan motor remains off until the compressor discharge pressure drops below 285 PSI, at which time the computer outputs a signal to turn the power on to the fan motor.

In accordance with yet another aspect of this invention, the procedures of the single refrigerant circuit can also be applied to a heat pump having a plurality of refrigerant circuits. In that situation, the preferred implementation, because of its simplicity and sufficiency, is to monitor the head pressure of each refrigeration circuit, and when one circuit is sensed to exceed the high pressure predetermined level, the evaporator fan motor is depowered until the head pressure of that same circuit falls below the low pressure predetermined level, regardless of the pressure state of the other refrigeration circuits, at which point the evaporator fan motor is repowered.

Figure 3:
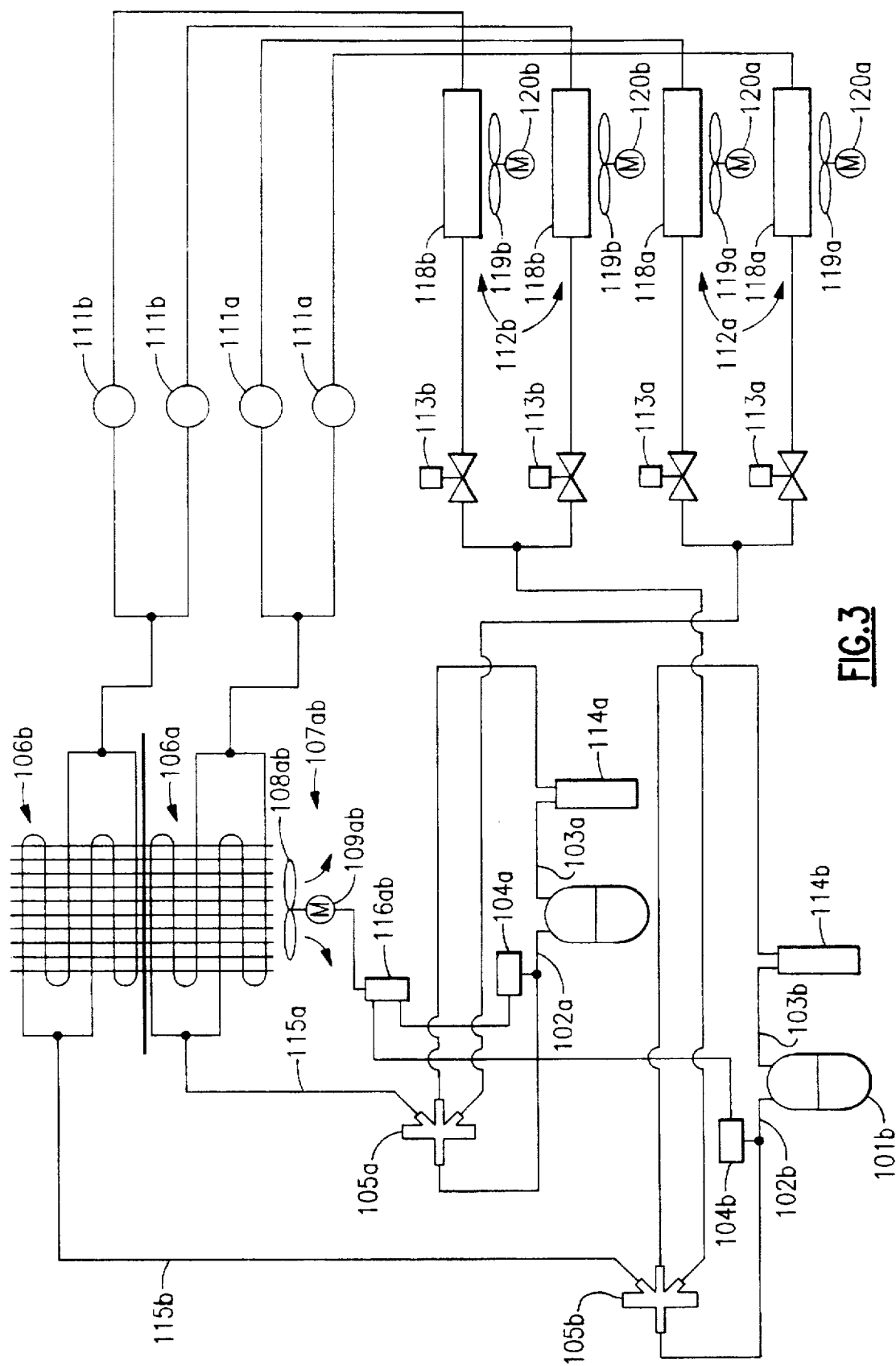
FIG. 3 is a simplified schematic diagram of a dual refrigerant circuit heat pump system with multiple condenser units operating in its evaporator heating cycle mode.

Referring to FIG. 3, there is shown a simplified schematic diagram of a preferred implementation of a dual refrigeration circuit heat pump in its heating cycle mode. The heat pump is shown to include two refrigeration circuits a and b sharing a common motor driven evaporator fan 107ab, comprising an evaporator fan 108ab and evaporator fan motor 109ab, and fan control computer 116ab. Refrigeration circuit a comprises compressor 101a, discharge side 102a, intake side 103a, a sensor consisting of a pressure transducer 104a, a reversing valve 105a, an evaporator 106a, expansion devices 111a (to create a pressure drop to change the refrigerant from a liquid state to a two-phase state), a condenser 112a, gas solenoid valves 113a (to close refrigerant flow), an accumulator 114a, and a refrigerant line 115a. The condenser 112a is multi-split, with 2 condenser units shown, and each condenser unit 117a comprises a heat exchanger 118a, an associated condenser fan 119a, and an associated condenser fan motor 120a. Each condenser unit is not collocated, and not in the same room. Comprising refrigeration circuit b are compressor 101b, discharge side 102b, intake side 103b, a sensor consisting of a pressure transducer 104b, a reversing valve 105b, an evaporator 106b, expansion devices 111b (to create a pressure drop to change the refrigerant from a liquid state to a two-phase state), a condenser 112b, gas solenoid valves 113b (to close refrigerant flow), an accumulator 114b, and a refrigerant line 115b. The condenser 112b is multi-split, with 2 condenser units shown, and each condenser unit 117b comprises a heat exchanger 118b, a condenser fan 119b, and a condenser fan motor 120b. Each condenser unit is not collocated, and not in the same room.

The dual refrigerant circuit heat pump preferred implementation is a modified Carrier 38QRS048. Each specified component, except the evaporator fan, is similar to the modified Carrier 38QRS048 described hereinbefore. The modified Carrier 38QRS048 has a 24 inch diameter, 3 blades, and 30 degree pitch per blade fan, and the fan is driven by a ¼ HP fixed speed 850 rpm sleeve bearing supported motor. The fan control computer 116ab executes a stored program that comprises the state control logic shown in TABLE, and discussed hereinbefore, wherein the two predetermined levels are determined to be 285 PSI and 315 PSI. TABLE 2 is a state table of a dual refrigerant circuit heat pump system operating in its heating cycle mode showing the command logic for evaporator fan operation for various combinations of compressor discharge pressures.

TABLE 2

DUAL REFRIGERATION CIRCUIT AND SINGLE OUTDOOR FAN HEAT PUMP STATE TABLE

| SYSTEM 1 DISCHARGE PRESSURE | SYSTEM 2 DISCHARGE PRESSURE | OUTDOOR FAN ACTION |
| --- | --- | --- |
| <315 psi | >315 psi | Turn off fan until SYSTEM 1 PRESSURE decreases below 285 psi. Then turn fan on. |
| <315 psi | >315 psi | Turn off fan until SYSTEM 2 PRESSURE decreases below 285 psi. Then turn fan on. |
| >315 psi | >315 psi | Turn off fan until the first SYSTEM that microcomputer execution indicates has a pressure > 315 psi decreases to < 285 psi. Then turn fan on. |

While this invention has been described with reference to an embodiment utilizing a particular state table and particular priority scheme, it will be understood that other state tables, algorithms, and priority schemes could be used without departing from the teachings of the present invention. Accordingly, the true spirit and scope of the present invention should be determined only with reference to the appended claims.

What is claimed is:

1. A heat pump operating in its heating cycle mode of a type having at least one refrigerant circuit wherein each said refrigerant circuit comprises a compressor, a condenser, an evaporator, and a refrigerant; and at least one motor driven evaporator fan in an air circulation relationship with at least one said evaporator, wherein each said evaporator is in said relationship with at least one said motor driven evaporator fan; and comprising:

a sensor that produces an electrical signal that varies in accordance with one of the pressure and temperature of said refrigerant on a discharge side of the compressor for at least one said refrigerant circuit; and speed control means for controlling the speed of at least one of said at least one motor driven evaporator fan in response to said electrical signal;

wherein said speed control means controls one of the pressure and temperature of at least one of said at least one refrigerant circuit.

2. A heat pump as set forth in claim 1, wherein at least one said condenser is multi-split.

3. A heat pump as set forth in claim 1, wherein said at least one motor driven evaporator fan consists of one motor driven evaporator fan.

4. A heat pump as set forth in claim 1, wherein said sensor includes a pressure transducer.

5. A heat pump as set forth in claim 1, wherein said sensor includes a thermistor.

6. A heat pump operating in its heating cycle mode of a type having at least one refrigerant circuit wherein each said refrigerant circuit comprises a compressor, a condenser, an evaporator, and a refrigerant; and at least one motor driven evaporator fan, having an on power state and an off power state, that is in an air circulation relationship with at least one said evaporator, and comprising:

a sensor that produces an electrical signal that varies in accordance with one of the pressure and temperature of said refrigerant on a discharge side of the compressor for each at least one said refrigerant circuit; and cycling means for sequentially cycling power to at least one of said at least one motor driven evaporator fans between the off power state and the on power state in response to said electrical signal;

wherein said cycling means controls one of the pressure and temperature of at least one of said at least one refrigerant circuit.

7. A heat pump as set forth in claim 6, wherein said cycling means comprises sequentially cycling power to said at least one of said at least one motor driven evaporator fans between the off power state in response to said electrical signal for each said at least one said refrigerant circuit rising above a first predetermined level, and the on power state in response to said electrical signal for each said at least one said refrigerant circuit dropping below a second predetermined level.

8. A heat pump as set forth in claim 6, wherein at least one said at least one motor driven evaporator fan comprises an evaporator fan motor of the type having a shaft that is supported by at least one sleeve bearing.

9. A heat pump as set forth in claim 8 having an evaporator ambient temperature and a time period between said off power state and a next said on power state for a given said ambient condition, wherein said first predetermined level and said second predetermined level are selected so that each said time period approximates a condition in which the surface of each said sleeve bearing remains lubricated at all times.

10. A heat pump as set forth in claim 9, wherein said first predetermined level and said second predetermined level are selected according to heating characteristics of said heat pump and according to power consumption efficiency of said heat pump.

11. A heat pump as set forth in claim 9, wherein
    said electrical signal varies in accordance with the refrigerant pressure,
    said first predetermined level is a compressor discharge pressure and approximates 315 psi,
    said second predetermined level is a compressor discharge pressure and approximates 285 psi, and
    said refrigerant is R22.

12. A heat pump as set forth in claim 9, wherein said cycling means comprises:
    a computer that includes a stored program memory, wherein said stored program includes
        instructions that cause said computer to read said electrical signal that varies in accordance with one of the pressure and temperature of said refrigerant of each said for at least one said refrigerant circuit, convert each said electrical signal to one of the pressure and the temperature of said refrigerant, compare each said converted electrical signal to said first predetermined level, compare each said read electrical signal to said second predetermined level, determine whether each said converted electrical signal is below said first predetermined level, determine whether each said converted electrical signal is above said second predetermined level, determine whether each said motor driven evaporator fan should be in said on power state or said off power state, and said computer executes said stored program and transmits a signal to each said motor driven evaporator fan for power on if said program execution indicates a said on power state, and power off if said program execution indicates a said off power state.

13. A heat pump as set forth in claim 12, wherein said instruction that causes said computer to determine whether each said motor driven evaporator fan should be in said on power state or said off power state comprises:

determine that a said motor driven evaporator fan is in said off power state if a said converted electrical signal is above said first predetermined level, and that a said motor driven evaporator fan is in the on power state if a said converted electrical signal is below said second predetermined level.

14. A heat pump operating in its heating cycle mode of a type having at least one refrigerant circuit comprising a compressor, a condenser, an evaporator, and a refrigerant; and at least one variable speed motor driven evaporator fan in an air circulation relationship with at least one said evaporator, wherein each said evaporator is in said relationship with at least one said motor driven evaporator fan, and comprising:

a sensor that produces an electrical signal that varies in accordance with one of the pressure and temperature of said refrigerant on a discharge side of the compressor for each said refrigerant circuit; and speed control means for controlling the speed of at least one of said variable speed motor driven evaporator fans in response to said electrical signal;

wherein said speed control means control one of the pressure and temperature of at least one of said at least one refrigerant circuit.

15. A heat pump as set forth in claim 14, wherein said speed control means include controlling the speed of said at least one of the variable speed motor driven fans so that a targeted speed is maintained.

16. A heat pump as set forth in claim 15, wherein said targeted speed is a speed that gives the combination of adequate heat dissipation and best electrical efficiency at a given evaporator ambient temperature.

17. A heat pump as set forth in claim 14 wherein at least one said at least one variable speed motor driven evaporator fan comprises an evaporator fan motor of the type having a shaft that is supported by at least one ball bearing.

* * * * *